(12) United States Patent
Kurita et al.

(10) Patent No.: US 7,525,765 B2
(45) Date of Patent: Apr. 28, 2009

(54) THERMAL ASSIST HEAD SLIDER

(75) Inventors: Masayuki Kurita, Ibaraki (JP);
Takehiko Hamaguchi, Kanagawa (JP);
Hidekazu Kohira, Kanagawa (JP);
Mikio Tokuyama, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 411 days.

(21) Appl. No.: 11/299,076

(22) Filed: Dec. 8, 2005

(65) Prior Publication Data
US 2006/0119971 A1 Jun. 8, 2006

(30) Foreign Application Priority Data
Dec. 8, 2004 (JP) .............................. 2004-355107

(51) Int. Cl.
*G11B 5/60* (2006.01)
(52) U.S. Cl. .................................. 360/235.4
(58) Field of Classification Search .............. 360/234.5, 360/234.4, 234.7, 75, 235.4; 29/603.23
See application file for complete search history.

(56) References Cited

U.S. PATENT DOCUMENTS

| | | | | |
|---|---|---|---|---|
| 5,587,857 A * | 12/1996 | Voldman et al. | .......... | 360/234.4 |
| 6,611,399 B1 * | 8/2003 | Mei et al. | ............... | 360/234.7 |
| 7,027,263 B2 * | 4/2006 | Ottesen et al. | ........... | 360/234.4 |
| 7,046,473 B2 * | 5/2006 | Fu et al. | ....................... | 360/75 |
| 7,088,543 B2 * | 8/2006 | Satoh et al. | ................... | 360/75 |
| 7,126,777 B2 * | 10/2006 | Flechsig et al. | ............... | 360/59 |
| 7,370,406 B2 * | 5/2008 | Yazawa | .................... | 29/603.23 |
| 2003/0035237 A1 * | 2/2003 | Lille | ....................... | 360/77.07 |
| 2003/0099054 A1 * | 5/2003 | Kamijima | ..................... | 360/59 |
| 2004/0190175 A1 * | 9/2004 | Chey et al. | ..................... | 360/59 |
| 2004/0240109 A1 * | 12/2004 | Hamann et al. | ............. | 360/126 |

FOREIGN PATENT DOCUMENTS

JP 2004-134051 4/2004
JP 2004134051 A * 4/2004

* cited by examiner

*Primary Examiner*—Tianjie Chen
(74) *Attorney, Agent, or Firm*—Townsend and Townsend and Crew LLP; Rambod Nader (57) ABSTRACT

In a magnetic disk apparatus, mounting of plural heating elements to a magnetic head slider is permitted. Thermally assisted magnetic recording from inner to outer surface is permitted at a small amount of power consumption. In one embodiment, the magnetic disk apparatus has a magnetic disk on which magnetic information is recorded, a magnetic head slider having an air bearing surface for floating from the magnetic disk in proximity thereto, and a rotary actuator moving over the disk arcuately while supporting the magnetic head slider by a suspension. A recording element acting to record magnetic information on the magnetic disk, a playback element acting to play back the magnetic information recorded on the magnetic disk, and plural heating elements acting to locally heat the magnetic disk are carried on the magnetic head slider. A circuit for switching energization to the plural heating elements and according to information about the direction of a DC power supply VH, frequency contained in an AC power supply, or the like is formed.

13 Claims, 11 Drawing Sheets

THERMAL ASSIST HEAD SLIDER

CROSS-REFERENCES TO RELATED APPLICATIONS

This application claims priority from Japanese Patent Application No. JP2004-355107, filed Dec. 8, 2004, the entire disclosure of which is incorporated herein by reference.

BACKGROUND OF THE INVENTION

The present invention relates to a magnetic disk apparatus fitted with a magnetic head slider and is especially adapted for a magnetic disk apparatus fitted with a magnetic head slider of the thermally assisted type which locally reduces the coercive force of a magnetic disk by a heating element and makes a magnetic recording at this location using a recording element.

To realize a magnetic disk apparatus of high recording density, it is necessary to make small recording particles on a magnetic disk. And, to permit small magnetization patterns to exist stably, it is necessary to enhance the coercive force of the magnetic disk. However, it has become more difficult to rewrite small recording particles of high coercive force without erasing data in adjacent tracks, using only recording elements.

To solve this problem, a magnetic recording method known as thermally assisted recording has been proposed. This thermally assisted magnetic recording adopts a magnetic disk whose coercive force at room temperature is higher than conventional. During recording, the magnetic disk is locally and momentarily heated. The moment the coercive force decreases, magnetic recording is made. The thermally assisted magnetic recording is adapted for vertical (perpendicular) magnetic recording, as well as for longitudinal magnetic recording. It is said that this is a technique necessary to dramatically improve the recording density of a magnetic disk apparatus in future. As a method of heating a magnetic disk, a Joule heating system of a simple structure using heating elements (heater) is being discussed along with the laser-heating type.

A cited problem with the thermally assisted magnetic recording is that the yaw angle varies when a magnetic head slider carrying record/playback elements thereon is driven by a rotary actuator and moves arcuately over a magnetic disk.

Figure 13:
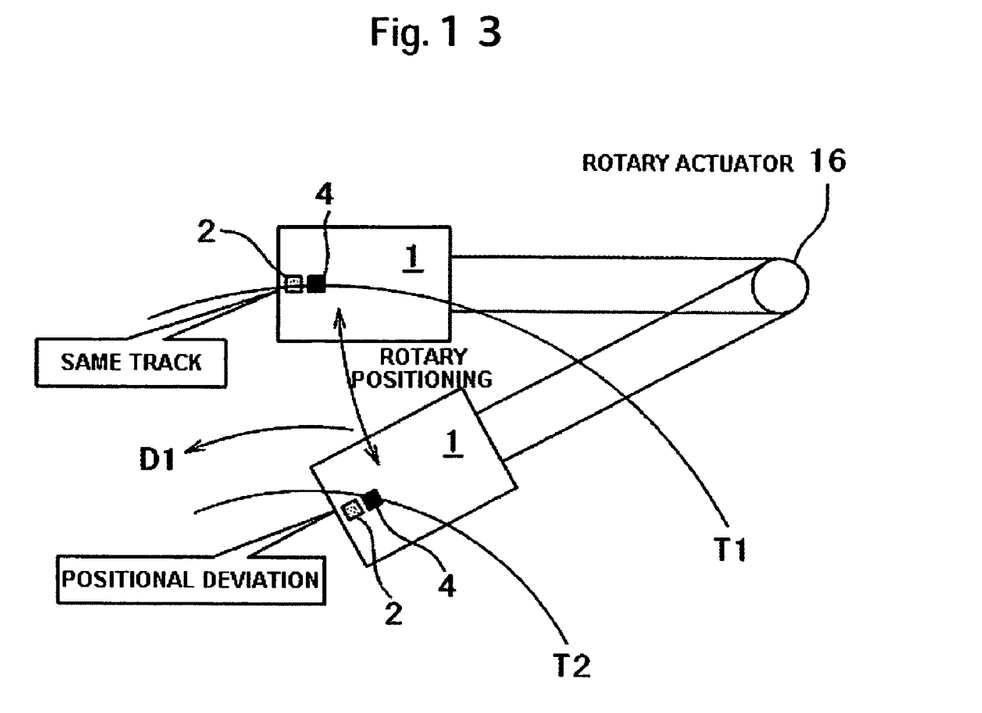
FIG. 13 is a diagram illustrating track deviation between the heating element and the recording element in a case where the rotary actuator of a conventional magnetic disk apparatus is used.

This point is described using FIG. 13. If recording is not done in a short period of the order of 10 microseconds from heating of a medium, heat will propagate to the surroundings and the temperature will drop. Therefore, it is impossible to make recording after waiting for several milliseconds in which the disk rotates once. Accordingly, a heating element 4 and a recording element 2 must be disposed on a straight line of a track (data row arrayed in a circumferential direction) on which recording is to be made. If the magnetic head slider 1 is placed in position using the rotary actuator 16, in a case where the recording element 2 and heating element 4 are over the same track in a track T1 lying in some radial position of the magnetic head slider 1, the center lines of movement of the heating element 4 and recording element 2 deviate at a track T2 in a different radial position. They are not located over the same track. If so, it is impossible to prewarm the area of the magnetic disk 1 to be recorded by the heating element 4. Since playback is done after being placed in position again, no problems will take place if the radial positional relation between the playback element 3 and other element deviates.

Figure 14:
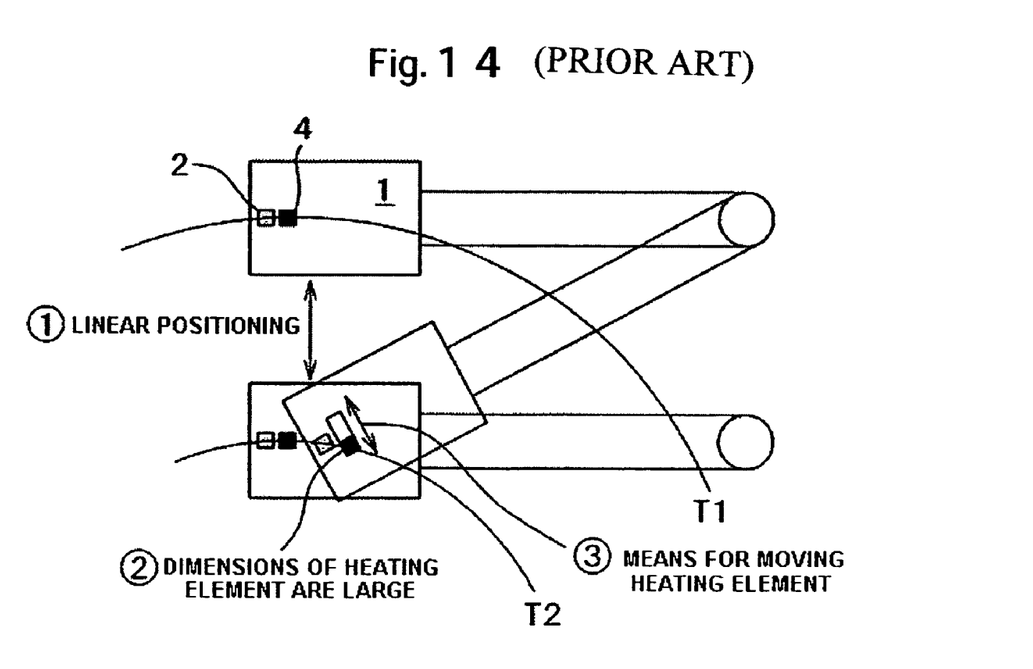
FIG. 14 is a diagram illustrating countermeasures against track deviation between the heating element and the recording element of a conventional magnetic disk apparatus.

In order to solve the problem of the track deviation between the heating element and the recording element due to variation of the yaw angle as described so far, four countermeasures have been heretofore proposed. First, as shown in FIG. 14, a linear actuator is adopted such that the heating element and recording element are kept over a track regardless of whether the track is the outer track T1 or the inner track T2. Secondly, as shown in FIG. 14, the dimensions of the heating element are increased such that the heating element and recording element are kept over a track regardless of whether the track is the outer track T1 or the inner track T2. Thirdly, as shown in FIG. 14, a means for moving the heating element is provided to maintain the heating element and recording element over a track regardless of whether it is the outer track T1 or the inner track T2. Fourthly, a plurality of heating elements are provided and electrically switched in a corresponding manner to variation in the yaw angle. Thus, the heating elements and recording element are kept over the track regardless of whether it is the outer track T1 or the inner track T2. The third and fourth countermeasures are disclosed in JP-A-2004-134051 (Patent Reference 1).

The first countermeasure is a countermeasure capable of certainly solving the track deviation between the heating element and the recording element. However, a linear actuator is expensive and large in size. It is quite difficult to use it in the present magnetic disk that is inexpensive and small in size.

With respect to the aforementioned second countermeasure, power consumption generating heat within the magnetic head slider 1 increases. If generation of heat within the magnetic head slider 1 is large, temperature rise of the playback element portion affects the life and reliability of the playback element. Another problem is that the contact possibility between the magnetic head slider 1 and magnetic disk is affected by thermal expansion known as thermal protrusion.

The aforementioned third countermeasure involves a complex structure and has a movable portion. Therefore, there remain elements to be developed in the future. Furthermore, this third countermeasure needs 2 lead wires of 1 system for driving, in addition to 6 lead wires of 3 systems for recording, playback, and heating. An increase in the number of lead wires results in an increased price. Additionally, there is the problem that it is difficult to mount them. Especially, in a small-sized slider (having a length of 0.85 mm, 0.7 mm, and a thickness of 0.23 mm) of a standard known as a femto slider, an area that can be used for electrical connection with a suspension is small. Realistically, only 6 lead wires of 3 systems can be mounted at best. It is quite difficult to mount 8 lead wires of 4 systems as in the third countermeasure.

With the aforementioned fourth countermeasure, 7 or more lead wires including record/playback elements in the case of two heating elements are necessary in order to supply power supply for all of plural heating elements independently from outside the slider into the slider. In the case of three heating elements, 8 or more lead wires are necessary. Therefore, the fourth countermeasure has the problem that an increase of the number of lead wires increases the price and makes it more difficult to mount them. Especially, it is quite difficult to mount them to a femto slider. Patent Reference 1 makes a mention of a configuration having a circuit that switches the used heating element inside a magnetic head slider. A lead wire or interconnect for a signal for selecting a heating element is connected with the switching circuit independently. Mounting of 6 lead wires of 3 systems is not achieved.

BRIEF SUMMARY OF THE INVENTION

It is a feature of the present invention to provide a magnetic disk apparatus which reduces the number of lead wires or interconnects connected between a magnetic head slider and a suspension to thereby permit mounting of a plurality of heating elements and which switches energization to each heating element in a corresponding manner to variation in yaw angle such that thermally assisted magnetic recording can be made from inner to outer surface with a small amount of power consumption.

In accordance with an aspect of the present invention, a magnetic disk apparatus includes: a magnetic disk on which magnetic information is recorded; a magnetic head slider having an air bearing surface for floating from the magnetic disk in proximity thereto; and a rotary actuator moving over the disk arcuately while supporting the magnetic head slider by a suspension. The magnetic head slider carries thereon a recording element that records magnetic information on the magnetic disk, a playback element that plays back the magnetic information recorded on the magnetic disk, and a plurality of heating elements that locally heat the magnetic disk. A circuit is formed on the magnetic head slider, the circuit acting to switch energization to the plural heating elements according to information about direction of a DC power supply, frequency contained in an AC power supply, or the like.

More preferable specific examples of configuration of the present invention described so far are as follows.

(1) Two of the heating elements being ahead of the recording element in a direction of movement and juxtaposed in a direction crossing the direction of movement are formed on the magnetic head slider by a thin-film process. A pair of thin film diodes for controlling which of the two heating elements should be made to generate heat is formed on the magnetic head slider by a thin-film process. The magnetic head slider and the suspension are electrically connected by 6 lead wires of 3 systems.

(2) Reverse-direction thin film diodes are connected in series with the heating elements. These series circuits are connected in parallel to form a series-parallel circuit. The series-parallel circuit is connected via two lead wires with a DC power supply capable of varying direction of energization.

(3) Two of the heating elements being ahead of the recording element in a direction of movement and juxtaposed in a direction crossing the direction of movement are formed on the magnetic head slider by a thin-film process. A coil and a capacitor are formed on the magnetic head slider by a thin-film process to control which of the heating elements should be made to generate heat. The magnetic head slider and the suspension are electrically connected by 6 lead wires of 3 systems.

(4) A coil is connected in series with one of the heating elements while a capacitor is connected in series with the other of the heating elements. These two series circuits are connected in parallel to form a series-parallel circuit. The series-parallel circuit is connected via two lead wires with a power supply that can be modified to a different frequency.

(5) Two or more of the heating elements being ahead of the recording element in a direction of movement and juxtaposed in a direction crossing the direction of movement are formed on the magnetic head slider by a thin-film process. A coil and a capacitor are connected in series with the heating elements. The series circuits are made different in resonant frequency that is determined by the inductance of the coil and the capacitance of the capacitor. The magnetic head slider and the suspension are electrically connected by 6 lead wires of 3 systems.

(6) The magnetic head slider is made up of a base plate portion or substrate portion of a mixed sintered body of alumina and titanium carbide and a thin-film head portion laminated on this substrate portion. The playback element, the heating elements, and the recording element are formed on the thin-film head portion by a thin-film process.

(7) Floating posture of the magnetic head slider is set such that an amount of float at an air outflow end is lower than an amount of float at an air inflow end. The playback element, the heating elements, and the recording element are installed on a side of the magnetic head slider closer to the air outflow end. The playback element, the heating elements, and the recording element are installed in this order as viewed from the air inflow end of the magnetic head slider.

(8) Floating posture of the magnetic head slider is set such that an amount of float at an air outflow end is lower than an amount of float at an air inflow end. The heating elements, the recording element, and the playback element are installed on a side of the magnetic head slider closer to the air outflow end. The heating elements, the recording element, and the playback element are installed in this order as viewed from the air inflow end of the magnetic head slider.

(9) Floating posture of the magnetic head slider is set such that an amount of float at an air inflow end is lower than an amount of float at an air outflow end. The heating elements, the recording element, and the playback element are installed on a side of the magnetic head slider closer to the air inflow end. The heating elements, the recording element, and the playback element are installed in this order as viewed from the air inflow end of the magnetic head slider.

(10) Floating posture of the magnetic head slider is set such that an amount of float at an air inflow end is lower than an amount of float at an air outflow end. The playback element, the heating elements, and the recording element are installed as viewed toward the air inflow end of the magnetic head slider. The playback element, the heating elements, and the recording element are installed in this order as viewed from the air inflow end of the magnetic head slider.

(11) The magnetic head slider is made up of a base plate portion or substrate portion of silicon and a thin-film head portion laminated on this substrate portion. The playback element, the heating elements, and the recording element are fabricated on the thin-film head portion by a thin-film process.

According to the present invention, the number of connecting lead wires between the magnetic head slider and the suspension is reduced to permit mounting of a plurality of heating elements. Energization of the heating elements is switched in a corresponding manner to variation in yaw angle. A magnetic disk apparatus permitting thermally assisted magnetic recording to be made from inner to outer surface with a small amount of power consumption can be accomplished.

BRIEF DESCRIPTION OF THE DRAWINGS

FIG. 11 is a perspective view of main portions of the magnetic head slider in the magnetic disk apparatus of Embodiment 5 of the present invention.

FIG. 12 is a perspective view of main portions of the magnetic head slider in the magnetic disk apparatus of Embodiment 6 of the present invention.

DETAILED DESCRIPTION OF THE INVENTION

A plurality of embodiments of the present invention are hereinafter described using figures. The same symbols in the figures of the embodiments and the prior art example indicate the same or corresponding objects. More effective ones can be achieved by appropriately combining the embodiments according to the need.

EMBODIMENT 1

A magnetic disk apparatus associated with Embodiment 1 of the present invention is described in the following using FIGS. 1 to 8.

Figure 1:
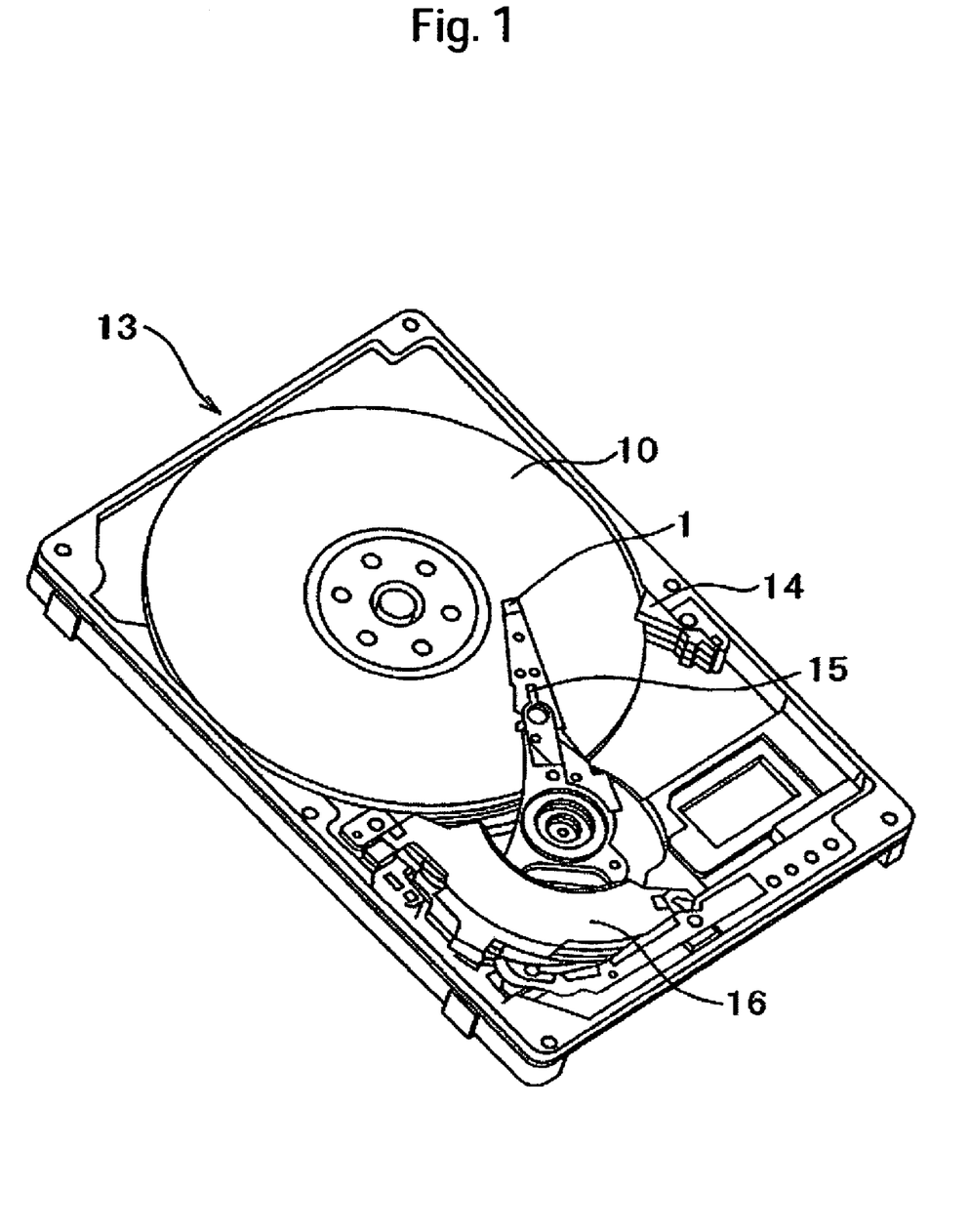
FIG. 1 is a perspective view of a magnetic disk apparatus associated with Embodiment 1 of the present invention.

First, the whole configuration of a magnetic disk apparatus 13 according to the present embodiment is described with reference to FIG. 1. FIG. 1 is a perspective view of the magnetic disk apparatus 13 of the present embodiment. Note that a cover is omitted in FIG. 1.

The magnetic disk apparatus 13 is constructed to have a disklike magnetic disk 10 on which magnetic information is stored and which is rotated by a spindle motor and a magnetic head slider 1 supported and placed in position radially by a load beam 15 on which a magnetic element 2 (see FIG. 2) and a playback element 3 (see FIG. 2) are carried. The magnetic head slider 1 runs over the magnetic disk 10 relative to it, and acts to read in information recorded on the magnetic disk 10 and to write information on the magnetic disk 10. The magnetic head slider 1 acts as a pneumatically lubricated bearing and is floated by a wedge film effect of air. Direct and solid contact between the magnetic disk 10 and the magnetic head slider 1 is prevented.

The magnetic head slider 1 is mounted to the load beam 15 that resembles a leaf spring. A pressing load is given to a surface of the magnetic disk by the load beam 15. A seek operation is performed in a radial direction of the magnetic disk 10 by a voice coil motor 16 together with the load beam 15. Recording or playback is done over the whole surface of the magnetic disk. The magnetic head slider 1 is shunted to above a ramp 14 from above the magnetic disk 10 when the apparatus is at rest or a read/write instruction ceases for a given time. Note that in the present embodiment, the apparatus fitted with the load/unload mechanism is shown. The advantages of the present invention can be similarly obtained even from a contact-start stop type magnetic disk apparatus in which the magnetic head slider 1 waits in a certain region of the magnetic disk 10 during stoppage of the apparatus.

Figure 2:
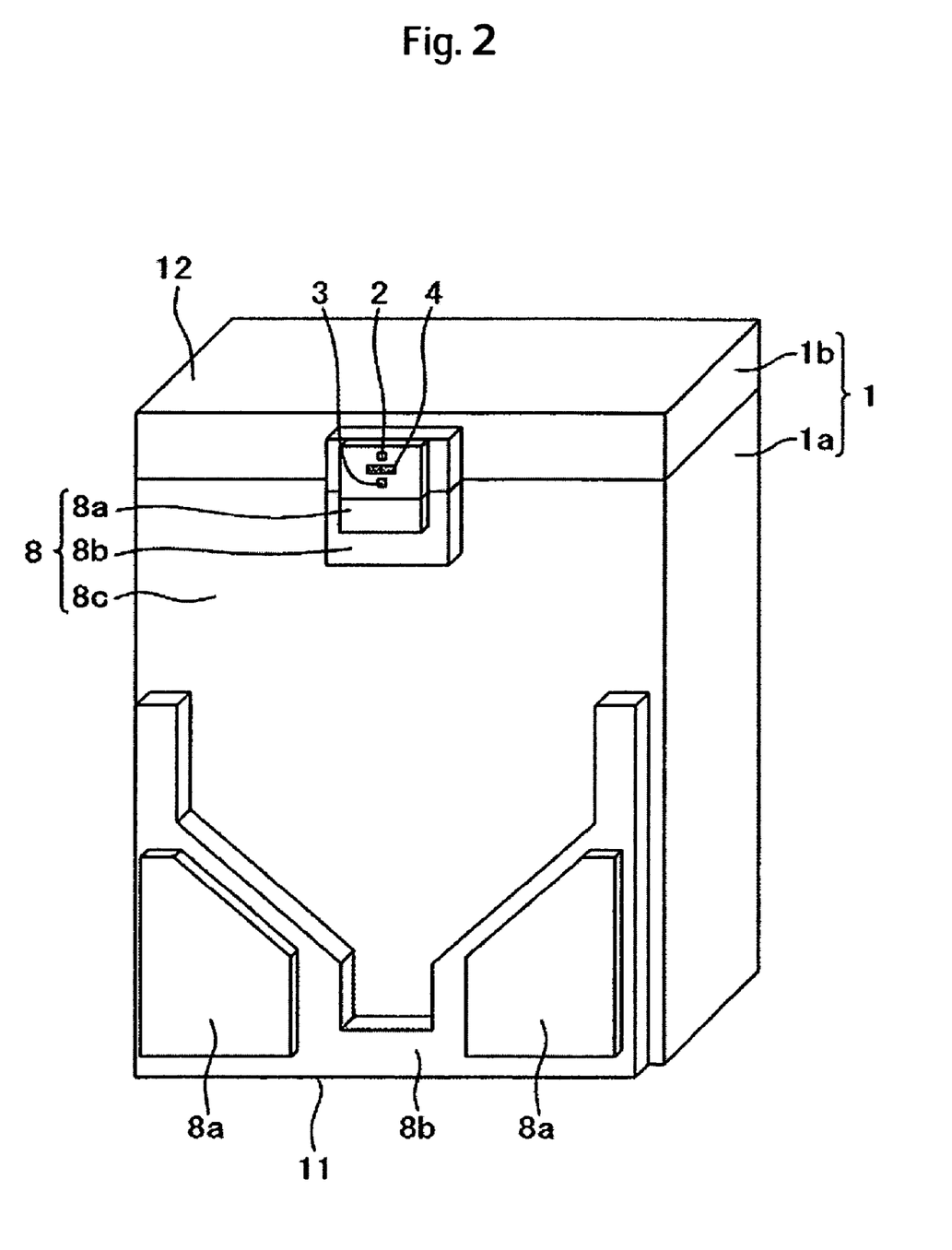
FIG. 2 is a perspective view of the magnetic head slider used in Embodiment 1.

The whole configuration of the magnetic head slider 1 is next described with reference to FIG. 2. FIG. 2 is a perspective view of the magnetic head slider 1 used in the present embodiment.

The magnetic head slider 1 is made up of a base plate or substrate (wafer) portion 1a consisting of a mixed sintered body (hereinafter abbreviated AlTiC) of alumina and titanium carbide and a thin-film head portion 1b. In a wafer state, process steps such as sputtering, plating, polishing, and so on are repeated to laminate the thin-film head portion 1b on the substrate 1a. Then, the magnetic head slider 1 is extracted from the wafer state by machining. The magnetic head slider 1 assumes a substantially rectangular form having a length of 1.25 mm, a width of 1.0 mm, and a thickness of 0.3 mm, for example. The slider is made up of six surfaces, i.e., an air-bearing surface 8, an air inflow end surface 11, an air outflow end surface 12, side surfaces on both sides, and a back surface. In the state of the magnetic head slider 1 or in a bar state prior to cutting into each magnetic head slider 1, the air-bearing surface 8 is finished smoothly by polishing. The dimensions of the magnetic head slider 1 can be other than the foregoing. A smaller standard having a length of 0.85 mm, a width of 0.7 mm, and a thickness of 0.23 mm is available. The advantages of the present invention can be obtained more greatly in a small-sized slider.

Microscopic steps (stepped bearing) are formed on the air-bearing surface 8 by a process such as ion milling or etching. The air-bearing surface is opposite to the magnetic disk 10 to produce an air pressure, and acts as an air bearing that supports a load applied to the back surface.

Steps made up of substantially parallel, three kinds of surfaces are formed on the air-bearing surface 8. That is, they are a rail surface 8a closest to the magnetic disk 10, a shallow groove surface 8b that is a stepped bearing surface and deeper than the rail surface 8a by about 100 nm to 200 nm, and a deep groove surface 8c that is deeper than the rail surface 8a by about 1 μm, i.e., 3 kinds. When an air flow produced by rotation of the magnetic disk 10 enters the rail surface 8a from the shallow groove surface 8b that is a stepped bearing from down to above in FIG. 2, the flow is compressed by the tapering flow passage, producing a positive air pressure. On the other hand, when the air flow enters the deep groove surface 8c from the rail surface 8a and shallow groove surface 8b, expansion of the flow passage produces a negative air pressure.

The magnetic head slider 1 is so designed that it floats in such a posture that an amount of float at a side of an air inflow end 11 is greater than an amount of float at a side of an air outflow end 12. Accordingly, the air-bearing surface close to the air outflow end 12 comes closest to the magnetic disk 10. The rail surface 8a protrudes toward the surrounding shallow groove surface 8b and deep groove surface 8c near the air outflow end 12 and so the rail surface 8a comes closest to the magnetic disk 10 unless the slider pitch posture and roll posture tilt beyond certain limits. The recording element 2 and the playback element 3 are formed in a portion belonging to the thin-film head portion 1b of the rail surface 8a. The shape of the air-bearing surface 8 is designed such that the load pressed from the load beam 15 and the positive or negative air pressure created at the air-bearing surface 8 are well balanced and that the distance from the recording element 2 and record/playback element 3 to the magnetic disk 10 is kept at an appropriate value of about 10 nm or less.

It is to be noted that in the present embodiment, the magnetic head slider 1 of two-stage stepped bearing air-bearing surface in which the air-bearing surface 8 is composed of substantially parallel three kinds of surfaces 8a, 8b, and 8c has been described. The same advantages of the present invention can be had also from a magnetic head slider of a stepped bearing air-bearing surface formed by four or more kinds of parallel surfaces.

Figure 3:
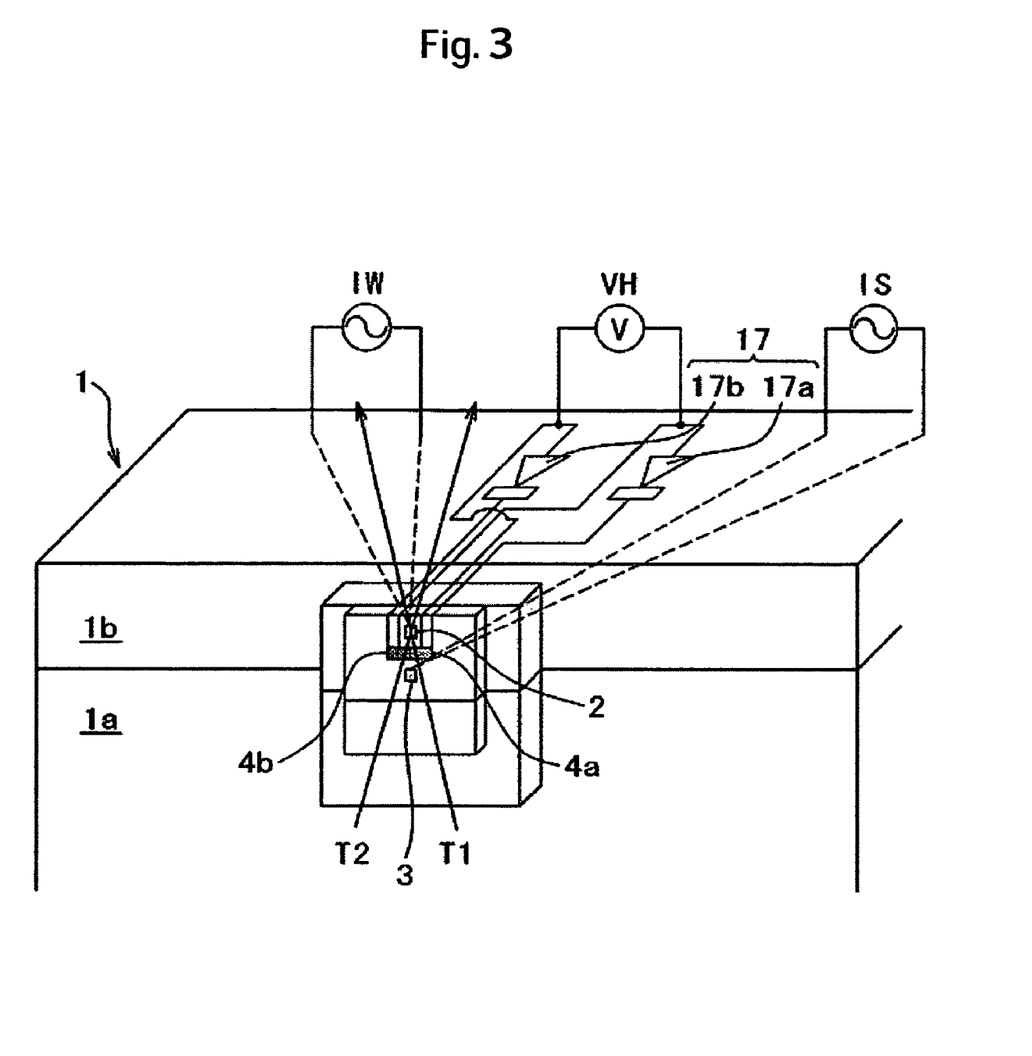
FIG. 3 is an enlarged schematic view of the magnetic head slider shown in FIG. 2 at the air outflow end side.

The structure of the thin-film head portion 1b of the magnetic head slider 1 is next described with reference to FIG. 3. FIG. 3 is an enlarged schematic view of the magnetic head slider 1 shown in FIG. 2 at the side of the air outflow end.

The magnetic disk 10 moves from below to above in FIG. 3. The magnetic head slider 1 that reads and writes magnetic information is configured to have an inductive recording element 2 that produces a magnetic field between magnetic poles by an electrical current flowing through a coil and records magnetic information and a magnetoresistive type playback element 3 that measures a variation in the resistance value caused by the magnetic field. The recording element 2 and playback element 3 are both made of a metal film, ceramic insulator film, resinous film, or the like formed using a thin-film process such as plating, sputtering, polishing, or the like on the AlTiC substrate portion 1a.

A plurality of heating elements 4 which are located ahead of the recording element 2 in the direction of motion of tracks and juxtaposed in a crossing direction are installed on the magnetic head slider 1. In the present embodiment, two heating elements 4 located between the recording element 2 and playback element 3 and consisting of a heating element 4a for outer surface and a heating element 4b for inner surface are formed as the thin-film head portion 1b on the substrate portion 1a by a thin-film process. In particular, a uniform film is created by sputtering an alloy of nickel and chromium (Nichrome). Undesired portions are removed by milling to form thin-film resistors of the heating element 4a for outer surface and the heating element 4b for inner surface. The dimensions of this Nichrome thin-film resistor are such that it is a rectangular form having a dimension of 250 nm in the direction of height of floating and a dimension of 1500 nm in the widthwise direction of the tracks, for example. If a film having a thickness of 40 nm is formed, the resistance value is about 150 Ohms. This Nichrome thin-film resistor is connected with interconnects or lead wires inside the slider made of a material such as copper or gold, and an electrical current is supplied to this Nichrome thin-film resistor from outside of the magnetic head slider 1.

Because of this structure, as shown in FIG. 3, a track T1 in a case where the magnetic head slider 1 is in the outer half of the magnetic disk 10 passes over the heating element 4a for outer surface and recording element 2. Conversely, a track T2 in a case where the magnetic head slider 1 is in the inner half of the magnetic disk 10 passes over the heating element 4b for inner surface and recording element 2. FIG. 3 shows the magnetic head slider 1 whose air-bearing surface is seen when the direction of rotation of the magnetic disk 10 is directed from the base of the suspension to its front end and when the magnetic disk 10 is seen to rotate in a counterclockwise direction. In the oppositely directed, magnetic head slider 1 whose air-bearing surface is not seen, the positional relationships between the heating element 4a for outer surface and the heating element 4b for inner surface of FIG. 3 and between the track T1 and track T2 are reversed right and left.

Note that in FIG. 3, a structure in which the two heating elements 4a and 4b are in the same layer is shown. A structure in which they are in different layers is also possible.

Here, a case in which there is only one heating element is described. It is assumed that the recording track width is 100 nm, the distance from the heating element to the recording element is 5000 nm, and the yaw angle is from plus to minus 15 degrees. To cover the above-described range of yaw angles, a heating element having a dimension of about more than 2800 nm in the direction of the track width is necessary. Although it is possible to fabricate a heating element having a dimension of about 3000 nm in the direction of the track width and to cause the element to generate heat substantially uniformly, it is only necessary to heat only one track. It follows that 30 tracks are heated wastefully. If heat sufficient to assist recording is produced in every area of the 30 tracks, the total amount of heat is exorbitant. This increases the danger that the surroundings of the heating element are thermally expanded and protruded into contact with the magnetic disk 10.

On the other hand, in order that the above-described range of yaw angles be covered by the two of the heating element 4a for outer surface and heating element 4b for inner surface as in the present embodiment, the dimension of each heating element in the direction of the track is only about 1500 nm. It is only necessary to heat data about 15 tracks compared with the case where there is only one heating element. The total amount of heat generated can be roughly halved compared with the case where there is only one heating element. This greatly reduces the danger that the surroundings of the heating elements are thermally expanded and protruded into contact with the magnetic disk 10.

Where the distance from each heating element to the recording element is further greater than 5000 nm, the need to reduce the total amount of generated heat by providing two heating elements is increased further. On the other hand, even in a case where the distance from each heating element to the recording element is smaller than 5000 nm, a thermally assisted effect can be obtained with reduced electric power if the present invention is used.

There are two kinds of recording system. That is, the directions of magnetization on the magnetic disk 10 are longitudinal (in-plane) direction and vertical (perpendicular) direction. The structures of the recording element and magnetic disk 10 are different according to the system. The advantages of the present invention can be obtained from either system. Especially, in the vertical recording system, the dimension of the recording element in the direction of the thin-film layer (the direction of rotation of the magnetic disk 10) is large. That is, it is urged that the distance between the main magnetic pole of the head of the vertical recording system and the return magnetic pole be larger than the distance between the upper magnetic pole and lower magnetic pole of the head of the longitudinal recording system. Accordingly, it can be said that in the vertical recording system, the distance from the heating element to the recording element is longer and thus the necessity of the present invention is higher.

Figure 4:
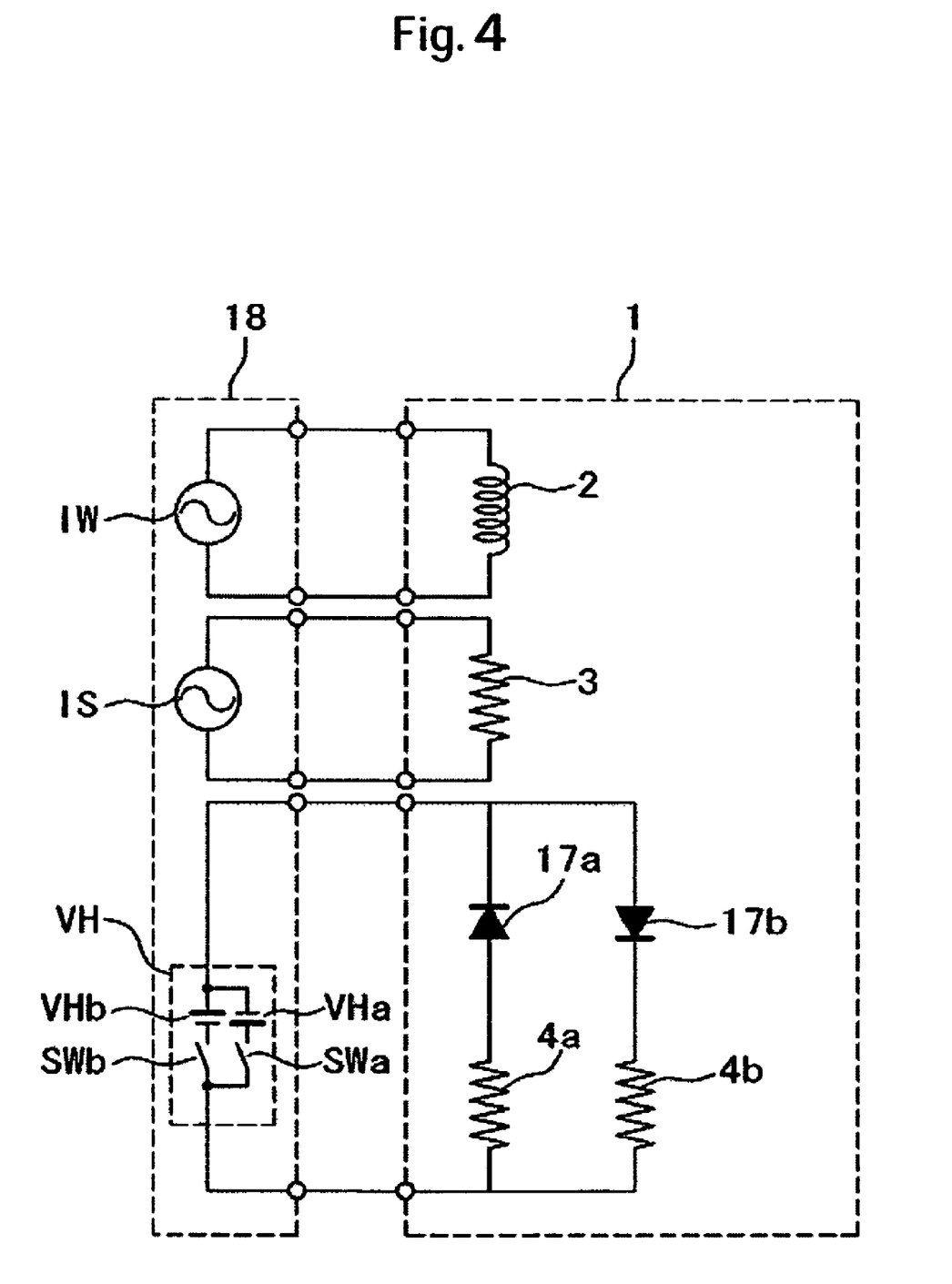
FIG. 4 is an electrical circuit diagram associated with the magnetic head slider shown in FIG. 3.

The electric circuit of the magnetic head slider 1 is next described with reference to FIGS. 3 and 4. FIG. 4 is an electric circuit diagram associated with the magnetic head slider 1 shown in FIG. 3.

To control the two kinds of heating elements, i.e., the heating element 4a for outer surface and heating element 4b for inner surface, 4 lead wires of 2 systems are generally necessary. Alternatively, either positive or negative is shared, and 3 lead wires are necessary for connection with the power supply side. However, if the number of lead wires is large, it is difficult to mount the heating elements 4 to the magnetic head slider 1. In the present embodiment, the characteristics that the two heating elements 4a and 4b are not used at the same time are noticed. Two systems are arranged in parallel. Which of the heating elements 4a and 4b is operated is controlled according to whether the applied voltage is positive or negative, using a pair of thin film diodes 17 mounted to the magnetic head slider 1. Lead wires to the power supply side are two lead wires.

According to the configuration of the present embodiment, lead wires electrically connected from the magnetic head slider 1 to a preamplifier 18 through the suspension are 6 lead wires of 3 systems for recording, playback, and heating. The recording element 2 is connected with an AC power supply IW by 2 lead wires of 1 system. The playback element 3 is connected with an AC power supply IS by 2 lead wires of 1 system. Furthermore, the heating element 4a for outer surface is connected in series with a thin film diode 17a. The heating element 4b for outer surface is connected in series with an oppositely directed thin film diode 17b. These series circuits are connected in parallel to form a series-parallel circuit. This series-parallel circuit is connected with a DC power supply VH by two lead wires of 1 system. The direction of energization of the DC power supply VH can be switched. The power supply consists of a pair of DC power supplies VHa and VHb and selector switches SWa and SWb connected in series with the DC power supplies VHa and VHb. The selector switches SWa and SWb are alternately turned on and off. By turning the selector switch SWa on, a DC current flows into the heating element 4a for outer surface through the diode 17a, causing the heating element 4a for outer surface to generate heat. By turning the selector switch SWb on, a DC current flows into the heating element 4b for outer surface through the diode 17b, causing the heating element 4b for inner surface to generate heat.

Figure 5:
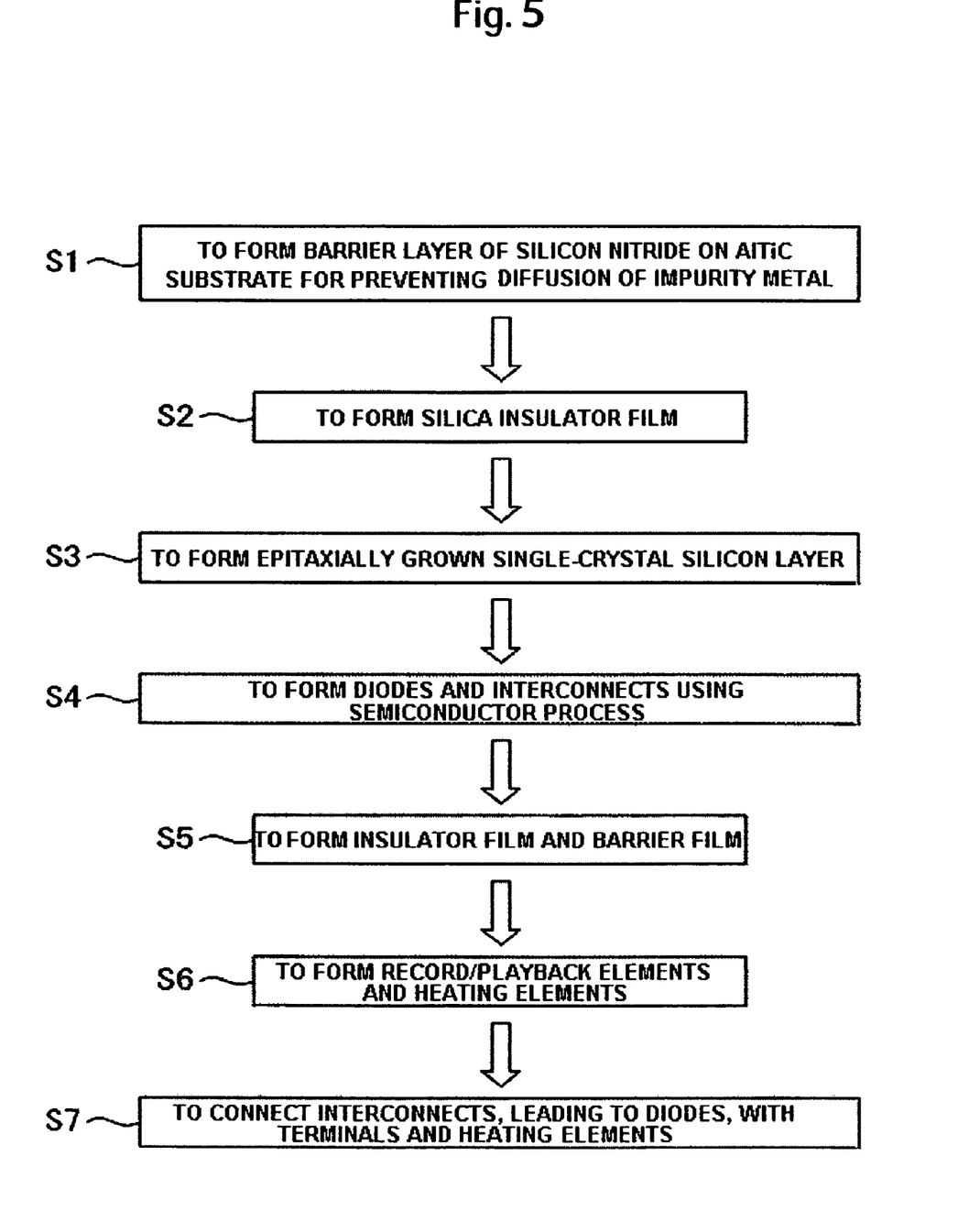
FIG. 5 is a flowchart on fabrication of the thin-film head portion of the magnetic head slider of FIG. 2.
Figure 6:
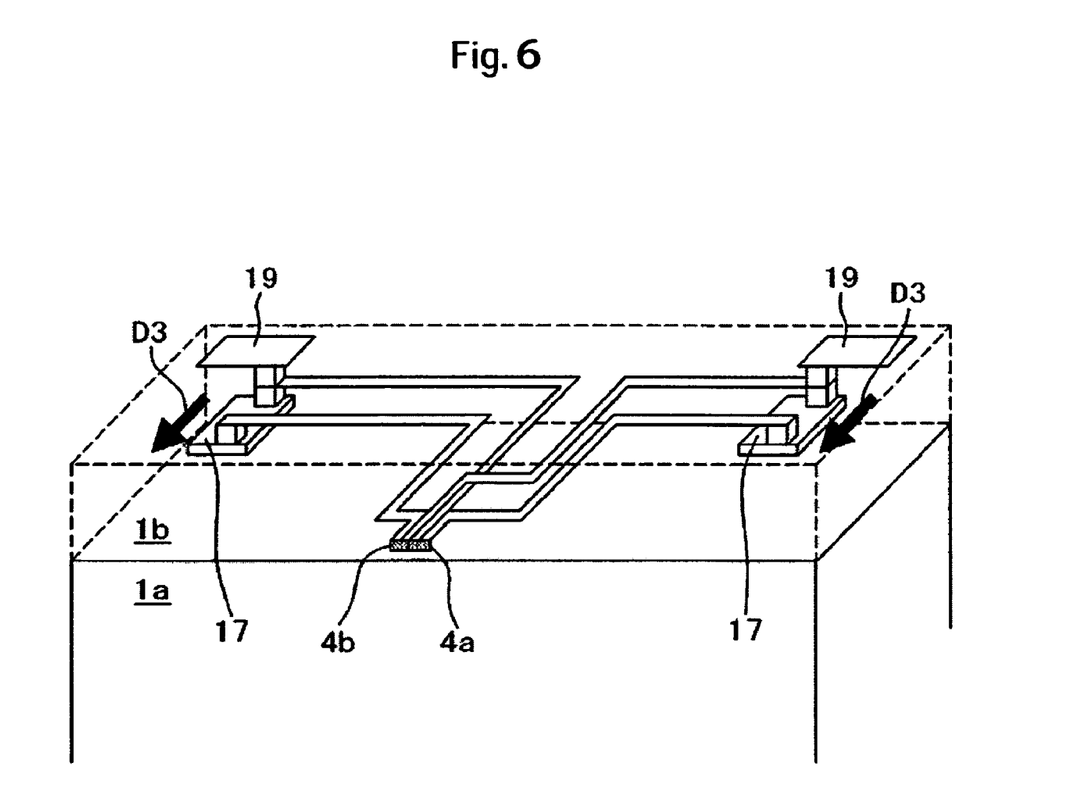
FIG. 6 is a specific structural view of heating elements, diode, terminals, stud, and lead wires of FIG. 3.

A method of fabricating the thin-film head portion 1b is next described with reference to FIGS. 5 and 6. FIG. 5 is a flowchart on fabrication of the thin-film head portion 1b of the magnetic head slider 1 of FIG. 2. FIG. 6 is a specific structural diagram of heating elements 4a, 4b, diode 17, terminal 19, stud, and lead wires of FIG. 3.

In the present embodiment, a thin film diode is first fabricated on the AlTiC substrate 1a. Then, record/playback elements and heating elements are formed. With respect to the positional relation in the direction of layers, a diode 17 is closest to the AlTiC substrate 1a and located on the lower side of FIG. 6. Then, the playback element 3, heating elements 4a and 4b, and recording element 2 follow. The advantages of the present invention are not limited to this order. The reverse order, i.e., the diode 17 is at a higher position, is also possible. That is, barrier and insulating layers are formed after fabricating record/playback elements and heating elements. Then, the thin film diode is fabricated.

As described so far, according to the present invention, electrical connection between the suspension and the magnetic head slider 1 is suppressed to within 6 lead wires of 3 systems. At the same time, the plural heating elements 4 can be used while being switched in a corresponding manner to variation in the yaw angle. As a result, for example, the two heating elements 4a and 4b for outer surface and inner surface can be switched and used. Half size and power consumption suffice compared with the case where a single heating element covers every radial position. Furthermore, the qualm that temperature rise of the playback element portion affects the reliability of the life of the playback element 3 or thermal expansion called thermal protrusion affects the contact possibility between the magnetic head slider 1 and the magnetic disk 10 decreases. Accordingly, thermally assisted magnetic recording can be applied to actual commercial products, contributing to an increase of the recording density of the magnetic disk surface and further to an increase of the capacity of the apparatus or miniaturization.

EMBODIMENT 2

Figure 7:
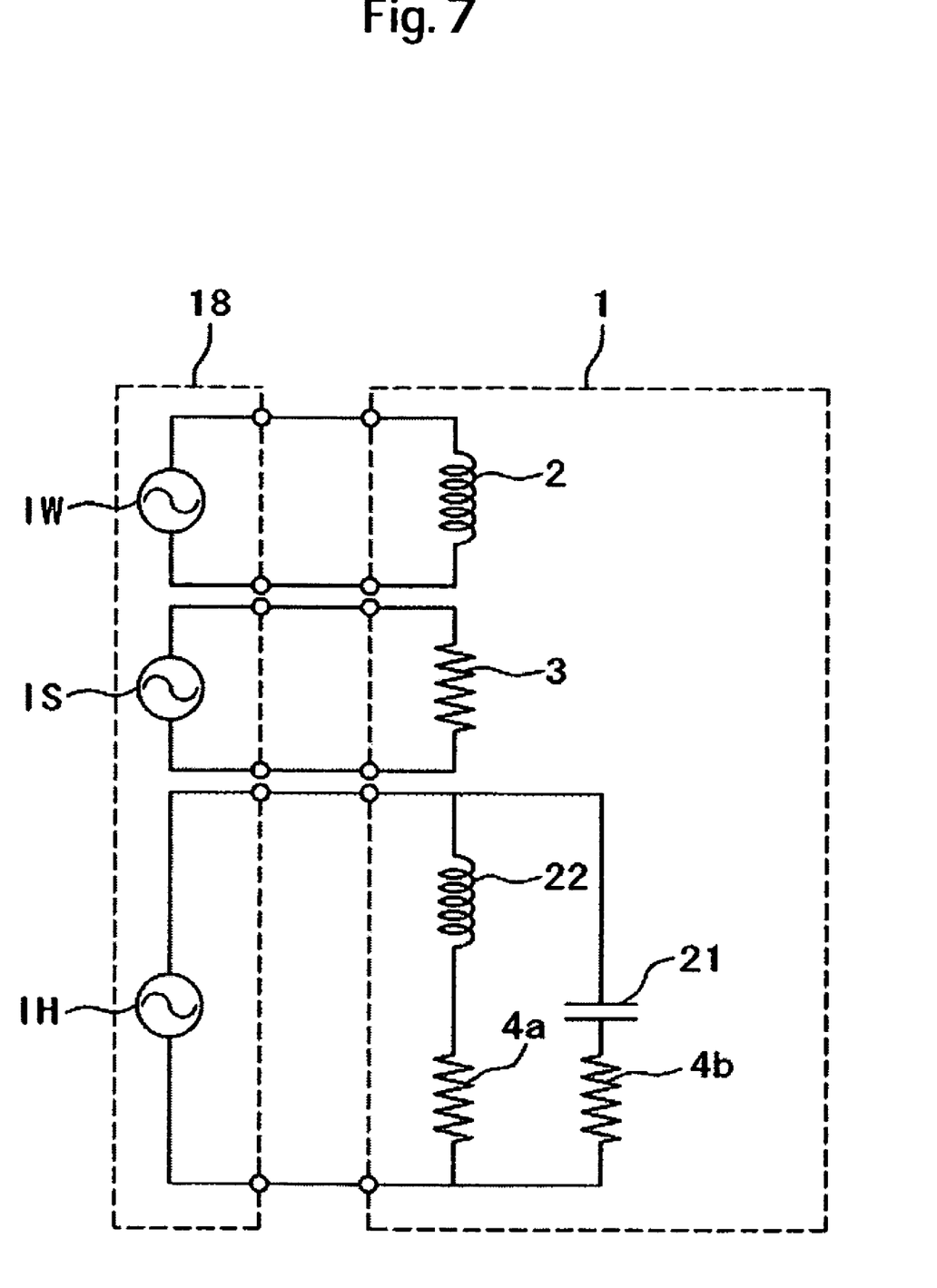
FIG. 7 is a circuit diagram including connecting lead wires between the magnetic head slider and the preamplifier in the magnetic disk apparatus of Embodiment 2 of the present invention.

Embodiment 2 of the present invention is next described using FIG. 7. FIG. 7 is a circuit diagram including connecting lead wires between a magnetic head slider 1 and a preamplifier 18 in a magnetic disk apparatus 13 of Embodiment 2 of the present invention. This Embodiment 2 is different from Embodiment 1 in the respects described next. In the other respects, Embodiment 2 is fundamentally identical with Embodiment 1.

In this Embodiment 2, a set of capacitor 21 and coil 22 is installed inside a magnetic head slider 1 instead of the thin film diode 17. That is, the capacitor 21 is connected in series with a heating element 4b. The coil 22 is connected in series with the heating element 4a. These series circuits are connected in parallel to form a series-parallel circuit. This series-parallel circuit is connected with an AC power supply IH for a preamplifier 18 via two lead wires from the magnetic head slider 1. In this Embodiment 2, heating elements 4a and 4b which should do heating are switched by varying the frequency of the AC power supply IH.

In particular, when one wants to cause mainly the heating element 4a for outer surface to generate heat, low-frequency AC voltage is applied from the power supply IH. In the case of the low-frequency AC voltage, the capacitance C of the capacitor 21 acts as a large resistance, so that substantially no current flows through the heating element 4b for inner surface. Instead of applying the low-frequency AC voltage, a DC power supply may be prepared, and a DC voltage may be applied. On the other hand, when one wants to cause mainly the heating element 4b for inner surface to generate heat, high-frequency AC voltage is applied from the power supply IH. The inductance L of the coil 22 acts as a large resistance. A substantially zero current flows through the heating element 4a for outer surface. If a capacitor is connected with the heating element 4a for outer surface and a coil is connected with the heating element 4b for inner surface in a reverse manner to the illustrated one, similar advantages can be obtained.

The above-described capacitor 21 is made of two electrodes which are opposite to each other at a short distance therebetween such that a ceramic such as $SiO_2$ acting as an insulator is sandwiched therebetween. The above-described coil 22 is a coil made of copper or is fabricated by forming magnetic poles such as Permalloy in the same way as used in the recording element 2 of the magnetic head slider 1.

According to this Embodiment 2, the plural heating elements 4a and 4b can be easily controlled only by modifying the frequency of the power supply IH.

EMBODIMENT 3

Figure 8:
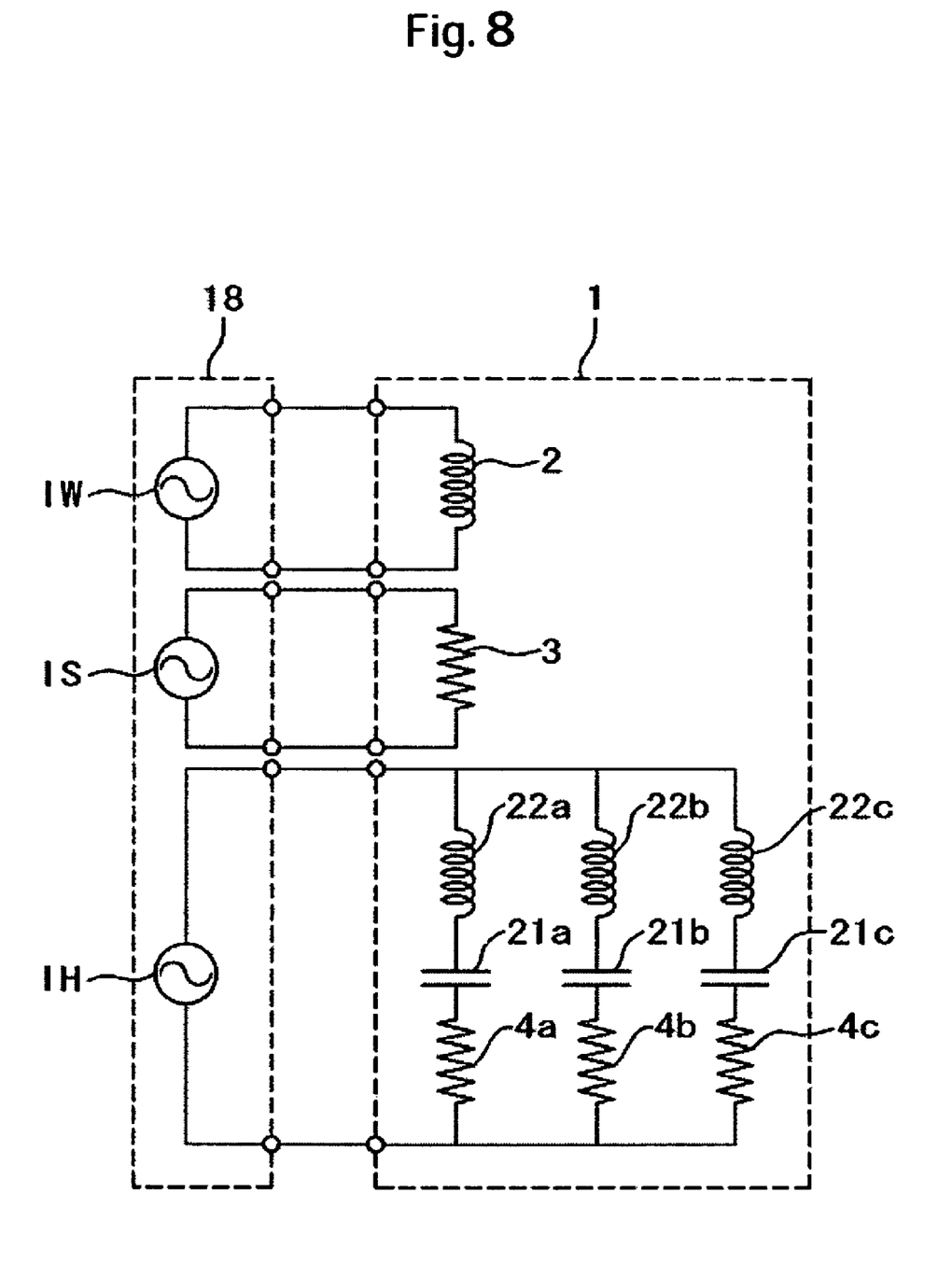
FIG. 8 is a circuit diagram including connecting lead wires between the magnetic head slider and the preamplifier in the magnetic disk apparatus in Embodiment 3 of the present invention.
Figure 9:
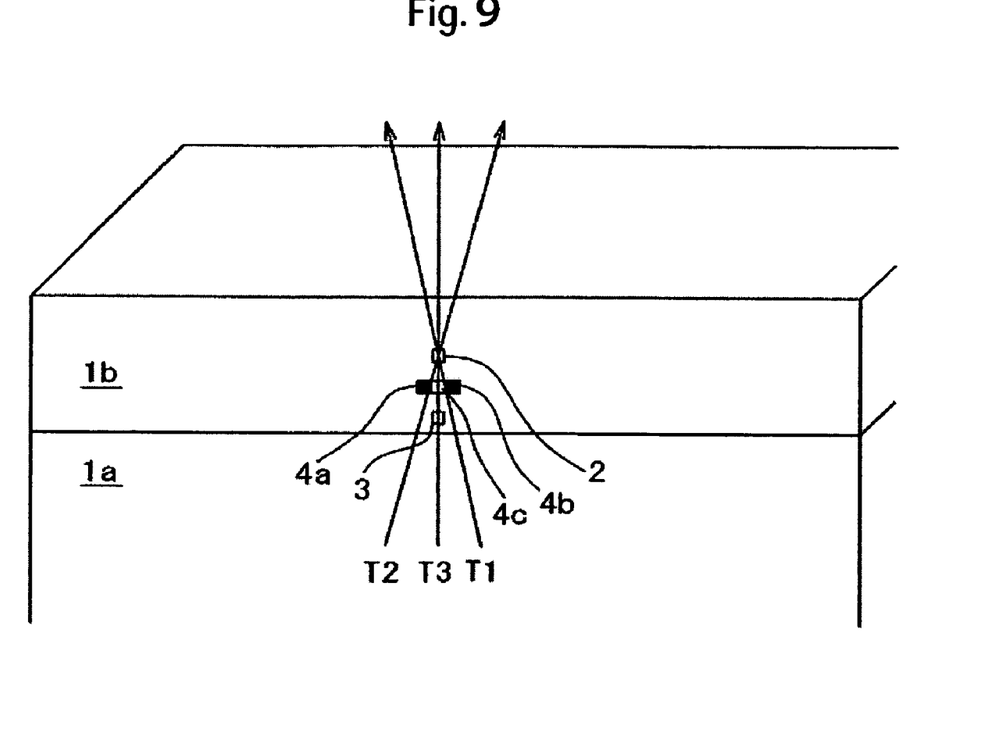
FIG. 9 is a perspective view of the magnetic head slider in FIG. 8.

Embodiment 3 of the present invention is next described using FIGS. 8 and 9. FIG. 8 is a circuit diagram including connecting lead wires between the magnetic head slider 1 and the preamplifier 18 in the magnetic disk apparatus 13 of Embodiment 3 of the present invention. FIG. 9 is a perspective view of the magnetic head slider 1 in FIG. 8. This embodiment 3 differs from Embodiment 2 in the respects described next. In the other respects, this embodiment is fundamentally identical with Embodiment 2.

In this Embodiment 3, series circuits of capacitors 21a-21c and coils 22a-22c are connected in series with the heating elements 4a-4c. These series circuits are connected in parallel to form a series-parallel circuit. This series-parallel circuit is connected with a power supply IH for a preamplifier 18 via two lead wires from the magnetic head slider 1. In this Embodiment 3, the heating elements 4a-4c that should do heating are switched by varying the frequency of the AC power supply IH.

In particular, the series circuits are so constructed that the resonant frequency $F=1/(2\pi\sqrt{(LC)})$ calculated from the inductance L of each of the coils 22a-22c in each series circuit and the capacitance C of each of the capacitors 21a-21c is greatly different between the series circuits. Which of the plural heating elements 4a-4c is energized is switched according to the frequency of the applied voltage.

In this Embodiment 3, more than two heating elements can be installed and they are switchingly used according to the yaw angle, unlike Embodiments 1 and 2 where heating elements are limited to two. Accordingly, thermally assisted recording can be accomplished with a smaller amount of power consumption, a smaller amount of heat generated inside the slider, and a smaller amount of thermal expansion. As shown in FIG. 9, heating for data on the track T3 when the magnetic head slider 1 is around the middle of the magnetic disk 10 is assigned to the heating element 4c for radial middle position. In Embodiment 3, the number of heating elements is not limited to three. The number of heating elements may be increased further, and the dimensions of the heating elements may be reduced. In FIG. 9, a structure in which three heating elements are in the same layer is shown. They may be in different layers.

EMBODIMENT 4

Figure 10:
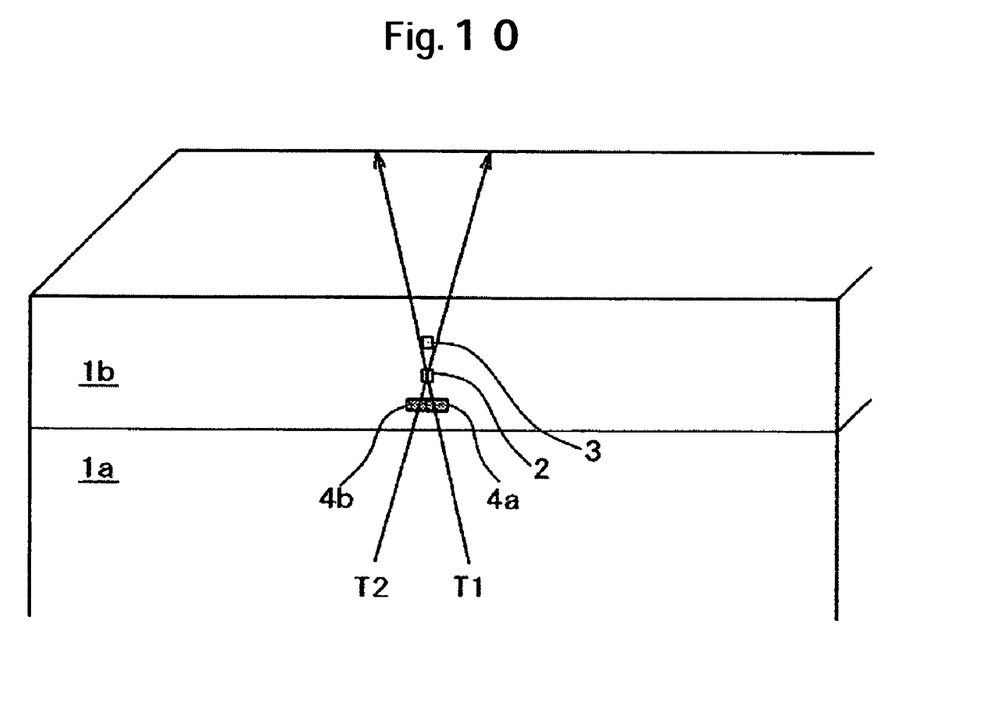
FIG. 10 is a perspective view of main portions of the magnetic head slider in the magnetic disk apparatus of Embodiment 4 of the present invention.

Embodiment 4 of the present invention is next described using FIG. 10. FIG. 10 is a perspective view of main portions of the magnetic head slider 1 in a magnetic disk apparatus 13 of Embodiment 4 of the present invention. This Embodiment 4 is different from Embodiment 1 in the respects described next. In the other respects, Embodiment 4 is fundamentally identical with Embodiment 1.

In this Embodiment 4, what is located closer to the substrate portion 1a is a recording element 2. What is located farther away from a substrate portion 1a is a playback element 3. The order of the recording element 2 and playback element 3 is reversed to the presently commercialized magnetic head slider 1. In this case, it is adequate to adopt a structure in which the heating elements 4a and 4b are placed between the substrate portion 1a and the recording element 2. The mechanism for switching of the heating elements 4a and 4b may be the configuration shown in Embodiment 2 or Embodiment 3, i.e., a configuration using a combination of a coil and a capacitor or plural sets of coils and capacitors.

The present magnetoresistive playback element is vulnerable to heat. Therefore, the structure of Embodiment 4 in which the playback element 3 and heating element 4 are at a remote distance is excellent in terms of reliability of the playback element 3 than the structure shown in Embodiment 1 where the playback element 3 and heating element 4 are at a shorter distance.

EMBODIMENT 5

Embodiment 5 of the present invention is next described using FIG. 11. FIG. 11 is a perspective view of main portions of a magnetic head slider 1 in a magnetic disk apparatus 13 of Embodiment 5 of the present invention. This Embodiment 5 is different from Embodiment 1 in the respects described next. In the other respects, Embodiment 5 is fundamentally identical with Embodiment 1.

In this Embodiment 5, the positional relation between the direction of rotation (direction of inflow of air) of the magnetic disk 10 and the floating posture of the slider is reversed to the currently commercialized magnetic disk apparatus. In currently commercialized magnetic disk apparatus, the floating posture is such that the amount of float at the air inflow end side is high while the amount of float at the air outflow end side is low. The recording element 2 and playback element 3 exist at the outflow end side of the magnetic head slider 1. In contrast, in this Embodiment 5, the floating posture is such that the amount of float at the air inflow end side is low, while the amount of float at the air outflow end side is high. The recording element 2 and playback element 3 exist at the air inflow end side of the magnetic head slider 1. This corresponds, for example, to a case where the positional relation of the slider inflow end and outflow end to the shape of the suspension is retained intact but the direction of rotation of the magnetic disk 10 is reversed to the present situation. That is, the direction of rotation is changed to the direction of rotation directed from the front end of the suspension to the base. In this case, a structure in which the heating elements 4a and 4b are located further above the recording element 2 as viewed from the substrate portion 1a is appropriate.

The mechanism for switching the operated heating element between 4a and 4b may be the structure shown in Embodiment 2 or Embodiment 3, i.e., a structure using a combination of a coil and a capacitor or a structure using plural sets of coils and capacitors.

EMBODIMENT 6

Embodiment 6 of the present invention is next described using FIG. 12. FIG. 12 is a perspective view of main portions of a magnetic head slider 1 in a magnetic disk apparatus 13 of Embodiment 6 of the present invention. This Embodiment 6 is different from Embodiment 5 in the respects described next. In the other respects, Embodiment 6 is fundamentally identical with Embodiment 5.

In this Embodiment 6, the floating posture is such that the amount of float at the air inflow side is low, while the amount of float at the air outflow end side is high. A recording element 2 and a playback element 3 exist at the inflow end side of the magnetic head slider 1. Furthermore, the order of the recording element 2 and playback element 3 is so set that one closer to the substrate portion 1a is the recording element 2, whereas one farther away from the substrate portion 1a is the playback element 3. The order is reverse to the presently commercialized magnetic head slider 1. The heating elements 4a and 4b of this Embodiment 3 are so configured as to be located between the recording element 2 and the playback element 3 as viewed from the substrate portion 1a.

The mechanism for switching the operated heating element between 4a and 4b may be the structure shown in Embodiment 2 or Embodiment 3, i.e., a structure using a combination of a coil and a capacitor or a structure using plural sets of coils and capacitors.

EMBODIMENT 7

Embodiment 7 of the present invention is next described without using any figure. This Embodiment 7 is different from Embodiment 1 in the respects described next. In the other respects, Embodiment 7 is fundamentally identical with Embodiment 1.

In this Embodiment 7, the substrate portion 1a is made of silicon instead of AlTiC. In a wafer state, process steps such as sputtering, plating, and polishing are repeated to laminate a thin-film head portion 1b on a substrate 1a. Then, numerous magnetic head sliders 1 are extracted from a wafer by etching. In the conventional AlTiC substrate, the magnetic head sliders 1 are extracted from a wafer by machining. The maximum advantage of the silicon magnetic head sliders 1 is that this can be achieved at low cost by etching.

Where silicon is used as the substrate material of the magnetic head slider 1 and silica is used as an insulating film for a thin-film head, the method of fabricating the thin film diode 17 is made simpler than a case where an AlTiC substrate is used. In particular, step S1 of forming a silicon nitride barrier film of FIG. 5, step S2 of forming a silica film, and step S3 of forming a film of a single crystal of silicon are made unnecessary.

The mechanism for switching the operated heating element between 4a and 4b may be the structure shown in Embodiment 2 or Embodiment 3, i.e., a structure using a combination of a coil and a capacitor or a structure using plural sets of coils and capacitors.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk apparatus comprising:
   a magnetic disk on which magnetic information is recorded;
   a magnetic head slider having an air bearing surface for floating from said magnetic disk in proximity thereto; and
   a rotary actuator moving over the disk arcuately while supporting said magnetic head slider by a suspension;
   wherein said magnetic head slider carries thereon a recording element that records magnetic information on said magnetic disk, a playback element that plays back the magnetic information recorded on said magnetic disk, and a plurality of heating elements that are positioned between the recording element and the playback element and configured to locally heat said magnetic disk; and
   wherein a circuit is formed on said magnetic head slider, the circuit acting to switch energization to said plural heating elements.

2. A magnetic disk apparatus as set forth in claim 1,
   wherein two of said heating elements being ahead of said recording element in a direction of movement and juxtaposed in a direction crossing the direction of movement are formed on said magnetic head slider by a thin-film process,
   wherein a pair of thin film diodes for controlling which of said two heating elements should be made to generate heat is formed on said magnetic head slider by a thin-film process, and
   wherein said magnetic head slider and said suspension are electrically connected by 6 lead wires of 3 systems.

3. A magnetic disk apparatus as set forth in claim 2,
   wherein reverse-direction thin film diodes are connected in series with said heating elements to form series circuits, wherein the series circuits are connected in parallel to form a series-parallel circuit, and
   wherein said series-parallel circuit is connected via two lead wires with a DC power supply capable of varying direction of energization.

4. A magnetic disk apparatus as set forth claim 2, wherein said magnetic head slider is made up of a substrate portion of a mixed sintered body of alumina and titanium carbide and a thin-film head portion laminated on said substrate portion, and wherein said playback element, said heating elements, and said recording element are formed on said thin-film head portion by a thin-film process.

5. A magnetic disk apparatus as set forth in claim 2,
   wherein floating posture of said magnetic head slider is set such that an amount of float at an air outflow end is lower than an amount of float at an air inflow end,
   wherein said playback element, said heating elements, and said recording element are installed on a side of said magnetic head slider closer to the air outflow end, and
   wherein said playback element, said heating elements, and said recording element are installed in order as viewed from the air inflow end of said magnetic head slider.

6. A magnetic disk apparatus as set forth in claim 2,
   wherein floating posture of said magnetic head slider is set such that an amount of float at an air inflow end is lower than an amount of float at an air outflow end,
   wherein said playback element, said heating elements, and said recording element are installed when viewed toward a side of said magnetic head slider closer to the air inflow end, and
   wherein said playback element, said heating elements, and said recording element are installed in order as viewed from the air inflow end of said magnetic head slider.

7. A magnetic disk apparatus as set forth in claim 2, wherein said magnetic head slider includes a substrate portion of silicon and a thin-film head portion laminated on said substrate portion, and wherein said playback element, said heating elements, and said recording element are formed on said thin-film head portion by a thin-film process.

8. A magnetic disk apparatus as set forth in claim 1,
   wherein the circuit switches energization to said plural heating elements according to information about a direction of a DC power supply.

9. A magnetic disk apparatus as set forth in claim 1,
   wherein the circuit switches energization to said plural heating elements according to information about a frequency contained in an AC power supply.

10. A magnetic disk apparatus as set forth claim 1, wherein said magnetic head slider is made up of a substrate portion of a mixed sintered body of alumina and titanium carbide and a thin-film head portion laminated on said substrate portion, and wherein said playback element, said heating elements, and said recording element are formed on said thin-film head portion by a thin-film process.

11. A magnetic disk apparatus as set forth in claim 1,
    wherein floating posture of said magnetic head slider is set such that an amount of float at an air outflow end is lower than an amount of float at an air inflow end,
    wherein said playback element, said heating elements, and said recording element are installed on a side of said magnetic head slider closer to the air outflow end, and
    wherein said playback element, said heating elements, and said recording element are installed in order as viewed from the air inflow end of said magnetic head slider.

12. A magnetic disk apparatus as set forth in claim 1,
    wherein floating posture of said magnetic head slider is set such that an amount of float at an air inflow end is lower than an amount of float at an air outflow end, wherein said playback element, said heating elements, and said recording element are installed when viewed toward a side of said magnetic head slider closer to the air inflow end, and wherein said playback element, said heating elements, and said recording element are installed in order as viewed from the air inflow end of said magnetic head slider.

13. A magnetic disk apparatus as set forth in claim 1, wherein said magnetic head slider includes a substrate portion of silicon and a thin-film head portion laminated on said substrate portion, and wherein said playback element, said heating elements, and said recording element are formed on said thin-film head portion by a thin-film process.

* * * * *